US005359361A

United States Patent [19]

Iwao et al.

[11] Patent Number: 5,359,361

[45] Date of Patent: Oct. 25, 1994

[54] IMAGE FORMING APPARATUS FOR FORMING TONER IMAGES

[75] Inventors: Naoto Iwao, Nagoya; Shoji Yamada, Konan, both of Japan

[73] Assignee: Brother Kogyo Kabushiki Kaisha, Aichi, Japan

[21] Appl. No.: 994,958

[22] Filed: Dec. 22, 1992

[30] Foreign Application Priority Data

| | | | |
|---|---|---|---|
| Dec. 24, 1991 | [JP] | Japan | 3-341009 |
| Feb. 20, 1992 | [JP] | Japan | 4-033370 |
| May 13, 1992 | [JP] | Japan | 4-120512 |

[51] Int. Cl.[5] .............................................. G01D 15/06

[52] U.S. Cl. .................................... 346/159; 355/261; 355/262

[58] Field of Search ........................ 355/245, 261, 262; 346/153.1, 155, 159

[56] References Cited

U.S. PATENT DOCUMENTS

| | | | |
|---|---|---|---|
| 3,689,935 | 9/1972 | Pressman et al. | 346/74 ES |
| 4,478,510 | 10/1984 | Fujii et al. | 355/215 X |
| 4,491,855 | 1/1985 | Fujii et al. | 346/153.1 |
| 4,498,090 | 2/1985 | Honda et al. | 346/159 X |
| 4,518,955 | 2/1986 | Hosoya et al. | 346/153.1 |
| 5,027,157 | 6/1991 | Hotomi et al. | 355/261 |
| 5,153,611 | 10/1992 | Kokado et al. | 355/261 X |
| 5,233,392 | 8/1993 | Kitamura | 355/261 |

*Primary Examiner*—Fred L. Braun

*Attorney, Agent, or Firm*—Oliff & Berridge

[57] ABSTRACT

In an image forming apparatus for forming a toner image on image recording medium, an aperture electrode is provided for modulating electrically charged toner particles to be applied on image recording medium to thereby form a toner image on the image recording medium. An oscillating device is provided on the aperture electrode for causing the aperture electrode to vibrate. The image forming apparatus is further provided with modulating device for modulating vibration properties of the vibration caused by the oscillating device. The modulating device modulates amplitude or frequency of the vibration.

25 Claims, 14 Drawing Sheets

IMAGE FORMING APPARATUS FOR FORMING TONER IMAGES

BACKGROUND OF THE INVENTION

1. Field of the Invention

The present invention relates to an image forming apparatus which directly regulates and modulates a flow of toner particles and forms toner images on image recording medium.

2. Description of the Related Art

Currently, an image forming apparatus of a type that jets toner particles onto image recording medium to record thereon toner images has been proposed, for example, in U.S. Pat. No. 3,689,935. According to the disclosure of this patent, the image recording apparatus includes a toner supply portion, an aperture electrode having a plurality of apertures, and a back electrode. The toner supply portion produces electrically charged toner particles, and provides the electrically charged toner particles toward the aperture electrode.

The aperture electrode for regulating and modulating the flow of toner particles includes an insulating layer, a first electrode layer coated on one side of the insulating layer, and a second electrode layer coated on the side of the insulating layer oppositing to the first electrode layer. The aperture electrode is formed with apertures or through-holes penetrating through the first electrode layer, the insulating layer and the second electrode layer. The second electrode layer includes multiple isolated segment electrodes which respectively surround each of the apertures.

The aperture electrode thus constructed controls the flow of the toner particles by selectively applying electric signals to, thereby producing an electric charge at, the isolated segments of the second electrode layer. Toner particles are selectively attracted to the isolated segments that are thus electrically charged and pass through the apertures surrounded by the isolated segments.

The back electrode is positioned to confront the aperture electrode for electrostatically attracting electrically charged toner particles which have passed through the aperture electrode. The back electrodes attracts and supports an image recording medium such as paper, to which the toner particles impinge and cling, forming toner images.

During the above-described recording process, however, the toner particles are liable to adhere to and block the apertures of the aperture electrode. More particularly, to obtain a dot diameter of less than 100 μm, which is the maximum dot diameter necessary for obtaining an image density of 240 DPI (dot per inch), the inner diameter of the apertures must be approximately 50 μm or less. However, image forces (the electrostatic force on a charge in the neighborhood of a conductor, which may be thought of as the attraction to the charge's electric image) formed on the aperture electrode causes the electrically charged toner particles to adhere to all the areas of the aperture electrode including in and around the apertures. The toner particles thus adhering in and around the apertures accumulate in and block the apertures, making output images irregular.

To solve this problem, one of the co-inventors of the present invention has proposed in co-pending U.S. patent application Ser. No. 07/783,248 filed Oct. 28, 1991, now U. S. Pat. No. 5,293,181, mechanism for preventing such blockage. The mechanism excites the aperture electrode with progressive waves having vibration acceleration sufficiently large to overcome the image forces that cause toner particles to adhere to the aperture electrode. In other words, the aperture electrode is applied with vibration acceleration which attains a repulsion force greater than the image force occurred in the aperture electrode.

The mechanism includes an oscillator installed on the aperture electrode for propagating the progressive waves. Because the aperture electrode is usually rectangular shaped with a plurality of apertures formed in a row running in the longitudinal direction of the aperture electrode, the oscillator is installed near one end of the row of apertures.

However, addition of this mechanism has created an additional problem in that reflected waves are generated in addition to the progressive waves. When the reflected waves and the progressive waves overlap, the waves interfere with each other, and therefore fluctuations in the amplitude of waves, including standing waves, appear. The vibration acceleration that toner particles are subjected to at nodes of the standing waves is insufficient for preventing their accumulation in the apertures.

To overcome this problem, the mechanism proposed in the co-pending U.S. patent application Ser. No. 07/783,248, filed Oct. 28, 1991, now U.S. Pat. No. 5,293,181, further provides an absorber, for absorbing the energy of the progressive waves, mounted at the end of the row of apertures opposing the oscillator and thereby preventing generation of reflected waves. More specifically, the absorber is provided to allow propagation of only progressive waves along the aperture electrode in the longitudinal direction. This insures that waves having a generally stable amplitude distribution in the longitudinal direction form on the aperture electrode. However, this absorber does not completely consume the energy of the progressive waves as required to prevent production of reflective waves. Completely consuming the energy of the progressive waves would require addition of complex devices, such as a device with its impedance being adjustable to completely match the impedance of the aperture electrode.

SUMMARY OF THE INVENTION

The present invention is achieved to solve the above-described problems, and therefore a first object of the present invention is to provide an image forming apparatus in which nodes of a standing wave which is produced on the aperture electrode through overlapping of the incident and reflected waves are always moved and do not stay any fixed portion and therefore toner particles are effectively prevented from accumulating on the aperture electrode at any fixed position.

A second object of the present invention is to provide an image forming apparatus in which no standing wave is developed on the aperture electrode through the overlapping of the incident and reflected waves and therefore the toner particles are effectively prevented from accumulating on the aperture electrode.

These and other objects of the present invention will be attained by providing an image forming apparatus for forming a toner image on image recording medium, comprising: an aperture electrode for modulating electrically charged toner particles to be applied on image recording medium to thereby form a toner image on the image recording medium; oscillating means for causing the aperture electrode to vibrate; and modulating means for modulating vibration property of the vibration caused by the oscillating means.

The modulating means may preferably include amplitude modulating means for modulating amplitude of the vibration caused by the oscillating means.

The modulating means may include frequency modulating means for modulating frequency of the vibration caused by the oscillating means. In the case where the aperture electrode resonates at an at least first and second frequencies, the frequency modulating means may vary the frequency of the vibration caused by the oscillating means within a frequency range which includes the at least first and second frequencies. The frequency modulating means may switch the frequency of the vibration caused by the oscillating means between the at least first and second frequencies.

The oscillating means preferably includes an exciting member for exciting an incident vibration wave to be propagated in the aperture electrode and a reflecting member for reflecting the incident vibration wave propagated along the aperture electrode to form a reflective vibration wave to be propagated along the aperture electrode back to the exciting member.

The modulating means preferably prevents the incident wave and the reflective vibration wave from producing a standing wave having a node on a fixed position on the aperture electrode. The modulating means includes overlap preventing means for preventing the incident vibration wave and the reflective vibration wave from overlapping. The modulating means may include amplitude modulating means for causing amplitude of one of the overlapping incident vibration wave and the reflective vibration wave to be zero. The amplitude modulating means may include selection means for intermittently producing the incident vibration wave.

The modulating means may include standing wave preventing means for preventing the incident and reflective vibration waves from producing the standing wave when the incident and reflective vibration wave overlap. The standing wave preventing means includes interference preventing means for preventing the overlapping incident and reflective vibration waves from interfering with each other. The interference preventing means includes frequency changing means for allowing the frequencies of the overlapping incident and reflective vibration waves to differ. The frequency changing means may vary the frequency of the incident vibration wave in a sweeping manner.

The modulating means may include means for preventing a node of a standing wave produced by the overlapping incident and reflective vibration waves from being positioned on a fixed position on the aperture electrode. The node preventing means includes means for alternately producing, on the aperture electrodes, at least two resonant standing waves which have their nodes at different positions.

The image forming apparatus may be further provided with a vibrating member mounted on the aperture electrode for allowing the aperture electrode to vibrate along with the vibrating member. The oscillating means causes the vibrating means to vibrate, and the modulating means modulates vibration property of the vibration caused by the oscillating meads.

According to another aspect of the present invention, an image forming apparatus for forming a toner image on image recording medium, comprises: an aperture electrode for modulating electrically charged toner particles to be applied to the image recording medium to thereby form a toner image on the image recording medium; a vibrating member mounted on the aperture electrode for allowing the aperture electrode to vibrate along with the vibrating member, the vibrating member resonating with at least two resonant frequencies; and oscillating means for causing the vibrating member to vibrate at frequencies which include the at least two resonant frequencies.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
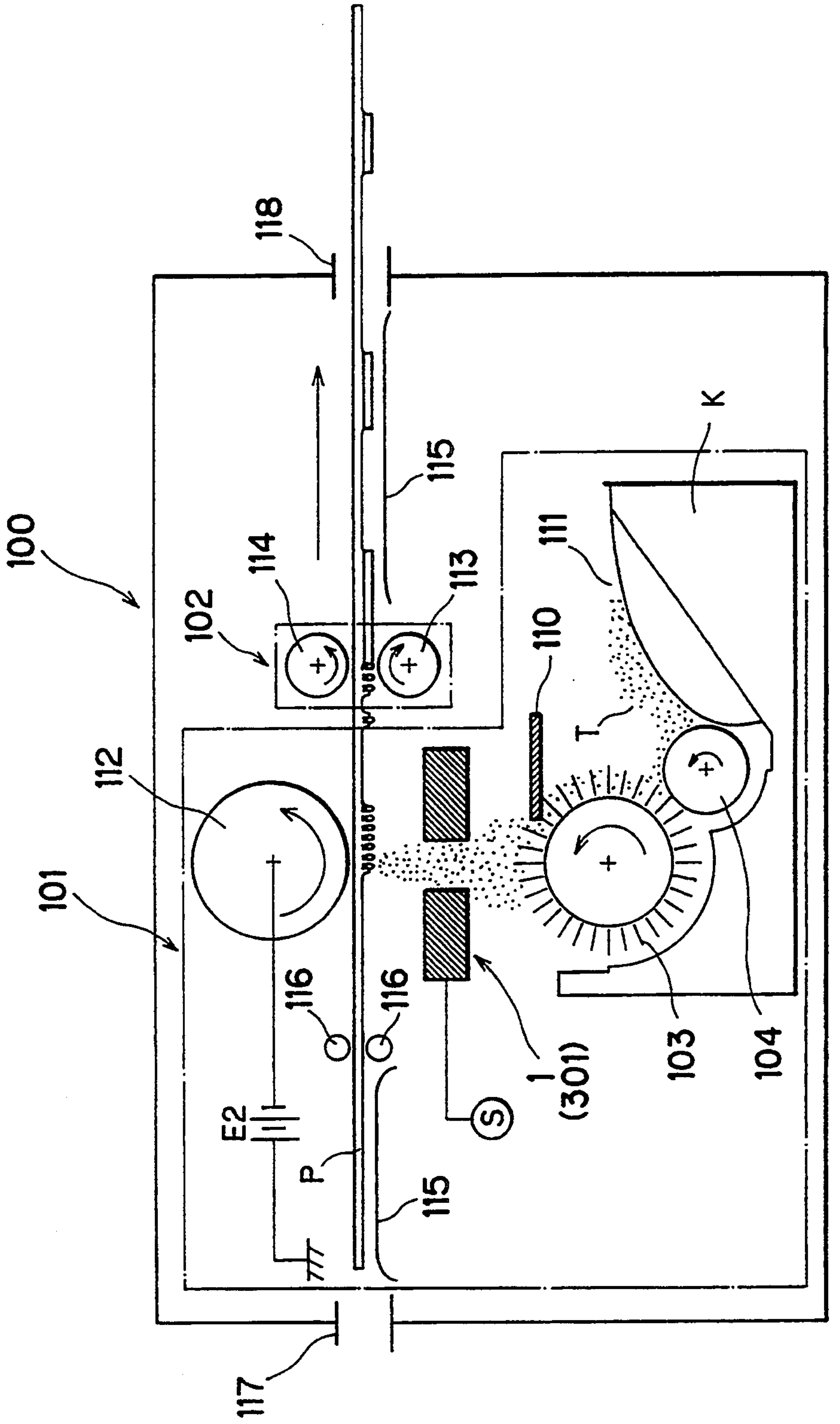
FIG. 1 schematically shows a structure of an image forming apparatus according to first through third embodiments of the present invention.

Referring to the accompanying FIGS. 1 through 5, a first preferred embodiment of the present invention will be described below wherein like parts and components are designated by the same reference numerals or characters to avoid duplication of description.

FIG. 1 schematically shows an image forming apparatus 100 according to the first embodiment of tile present invention. The image forming apparatus 100 mainly includes an image recording portion 101 and a thermal fixing portion 102.

An entrance 117 is formed on one side of the image recording apparatus 100, and an exit 118 on the other side thereof. An image recording medium P, such as paper, enters through the entrance 117 and is transported along a guide plate 115 by a pair of feed rollers 116 to the image recording portion 101 where toner images are formed on the image recording medium P. The image recording medium is then transported to the thermal fixing portion 102 where the toner images are fixed on the image recording medium P by well-known thermal fixing techniques. The image recording medium P is then guided along another guide plate 115 and discharged from the exit 118.

The image recording portion 101 includes a rectangular-shaped aperture electrode 1, a back electrode 112, a toner case K, a brush roller 103, a rotatable toner supply roller 104, and a scratch member 110. The supply roller 104 is installed to contact the brush roller 103 and a supply blade 111. The supply roller 104 and the supply blade 111 are contained by the toner case K. The aperture electrode 1 is positioned above the brush roller 103.

The scratch member 110 is installed so that the bristles of the brush roller 103 scratch against the scratch member 110. The back electrode 112 is electrically connected to the negative electrode of a power source E2.

The supply blade 111 stores thereon toner particles T. The supply blade 111 supplies a uniform amount of the toner particles T to the supply roller 104, so that a uniform layer of the toner particles are provided on the supply roller 104. The supply roller 104 rotates in the same direction as the brush roller 103 rotates to provide the toner particles T to the brush roller 103. The toner particles T are triboelectrically charged to a positive charge when they contact the supply roller 104 and the brush roller 103.

The toner particles are carried by the rotation of the brush roller 103 to the scratch member 110. Because the scratch member 110 is fixed to contact the bristles of the brush roller 103, the bristles of the brush roller 103 bend by their own elasticity when brought into contact with the scratch member 110 by rotation of the brush roller 103. When the brush roller 103 rotates sufficiently, the bristles snap away from the scratch member 110 by their own elasticity. This snapping action discharges the toner particles clinging to the bristles of the brush roller 103 to form a mist or cloud of toner particles which moves toward the aperture electrode 1.

As shown in FIG. 1, the back electrode 112 is installed above the aperture electrode 1 at a fixed distance from the aperture electrode 1. The image recording medium P inserted through the entrance 117 and guided by the pair of feed rollers 116 along the guide 115 goes between the back electrode 112 and the aperture electrode 1. The back electrode 112, being electrically connected to the negative electrode of the power source E2, attracts the positively charged toner T. Accordingly, the cloud of toner particles having passed through the apertures of the aperture electrode 1 are attracted toward the back electrode 112, so that the toner particles impinge and cling to a surface of the image recording medium.

The thermal fixing portion 102 includes a heat roller 113 provided with a heat source, and a press roller 114. The image recording medium P which has been formed with a toner image in the image recording portion 101 is transported between the heat roller 113 and the press roller 114 so that the toner image is thermally fixed to the image recording medium P. This fixation of the toner images is performed by well-known methods. Finally, the image recording medium P bearing thereon the toner images is guided along another guide 115 to be discharged from the exit 28.

The structure of the aperture electrode 1 according to the first embodiment is now described with reference to FIG. 2A. The aperture electrode 1 includes a base electrode layer 107, an insulating layer 106 formed on the base electrode layer 107 and multiple segmented control electrode 108 formed on the insulating layer 106. The aperture electrode 1 is formed with multiple apertures 11. Each of the multiple apertures 11 penetrates through a corresponding segment of the multiple segmented control electrode 108, the insulating layer 106 and the base electrode layer 107. The apertures 11 are centered on the aperture electrode, in the direction of arrow Z, to form a row of apertures 12 running in the direction of arrow X (i.e., a longitudinal direction of the rectangular-shaped aperture electrode 1).

Figure 2A:
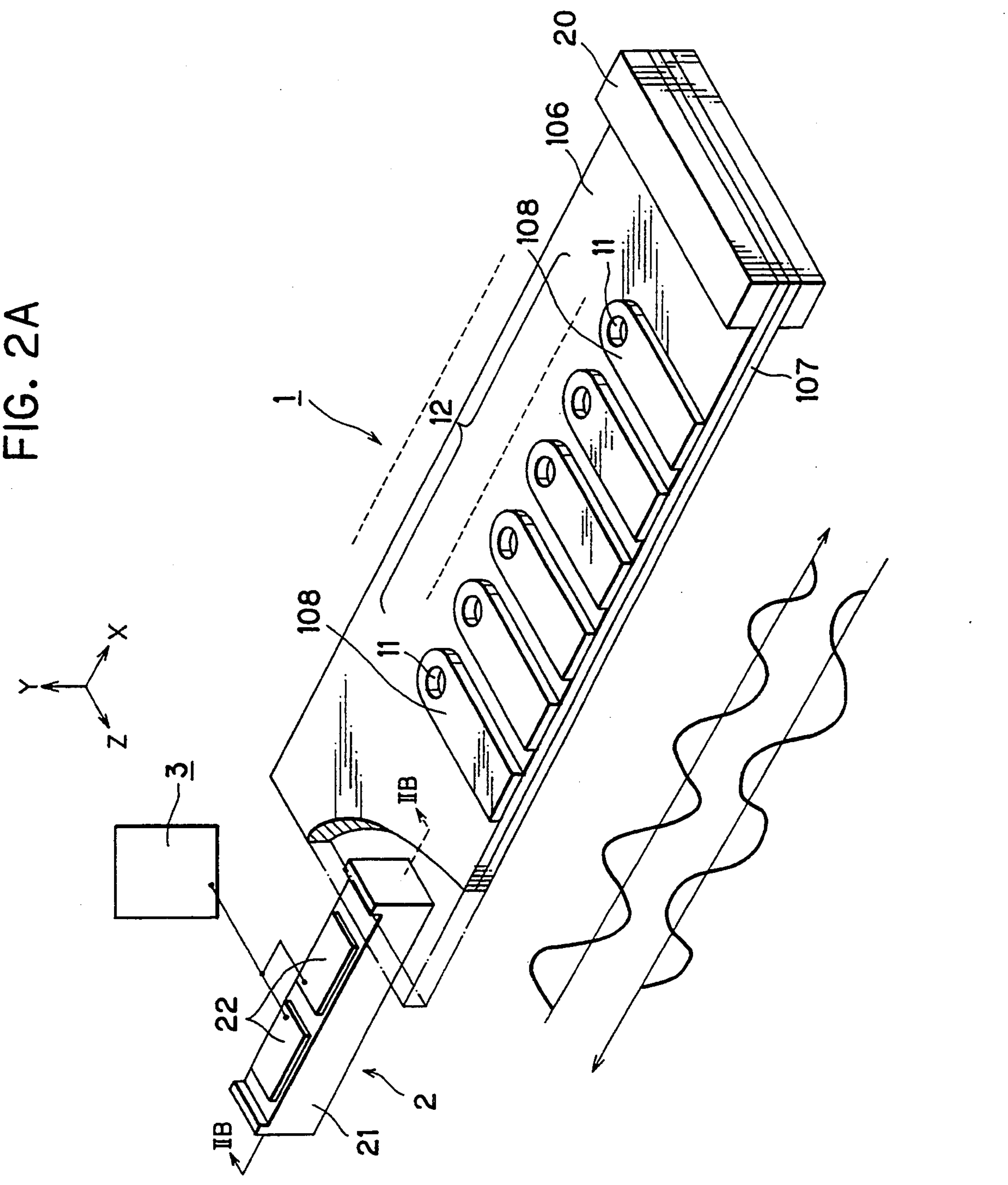
FIG. 2A is a perspective view of an aperture electrode according to the first embodiment of the present invention.

An oscillating device 2, for providing progressive waves to the aperture electrode 1, and a reflecting device 20 are fixed to opposing ends of the aperture electrode 1 in the direction indicated by the arrow labeled X in FIG. 2A, that is, in the direction of the row of apertures 12.

The oscillating device 2 is a resonating body which includes a metal elastic element 21 and a pair of piezoelectric elements 22. The piezoelectric elements 22 vibrate the elastic element 21 at a fixed vibration frequency. The elastic element 21 is constructed to resonate with the vibration applied from the piezoelectric elements 22. In other words, the electric element 21 is shaped and sized to have a resonation frequency of fr (kHz) which is the same as frequency of the vibration applied by the piezoelectric elements 22.

Figure 2B:
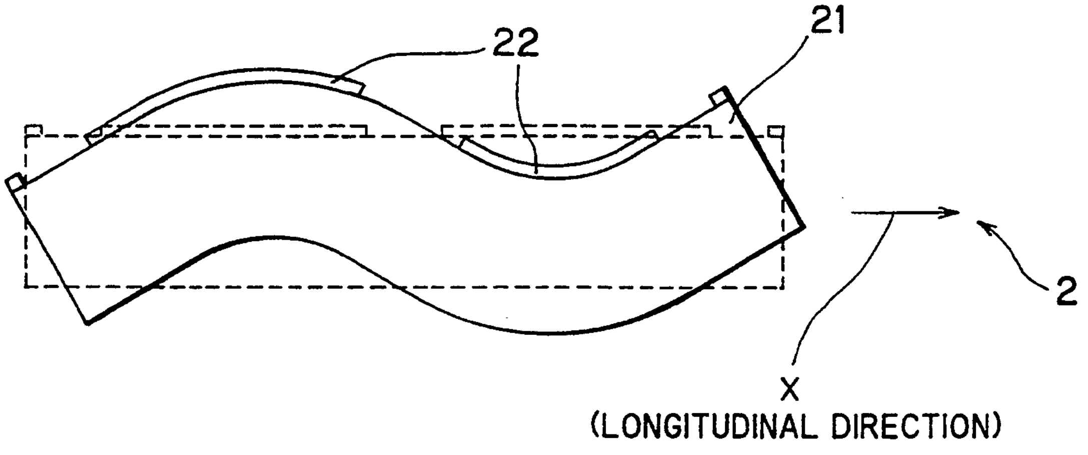
FIG. 2B is a side sectional view of an oscillating device 2 taken along a line IIB—IIB of FIG. 2A.

As shown in FIG. 2A, the elastic element 21 has a rectangular shape with its longitudinal direction in coincidence with the longitudinal direction of the aperture electrode, i.e., the X direction. The pair of piezoelectric elements 22 are arranged on the elastic element 21 in its longitudinal direction. With such a construction, as shown in FIG. 2B, the elastic element 21 is vibrated so that it bends in a secondary vibration mode in accordance with the expansion vibrations developed on the piezoelectric elements 22. The vibration of the elastic element 21 is transferred onto the aperture electrode 1 where it is propagated thereon along the longitudinal direction as a progressive wave.

According to the first embodiment, the amplitude of the drive signal for driving the piezoelectric elements 22 is modulated. Therefore, the amplitude of the progressive waves developed by the vibration of the piezoelectric elements and propagated on the aperture electrode 1 is also modulated.

Figure 3:
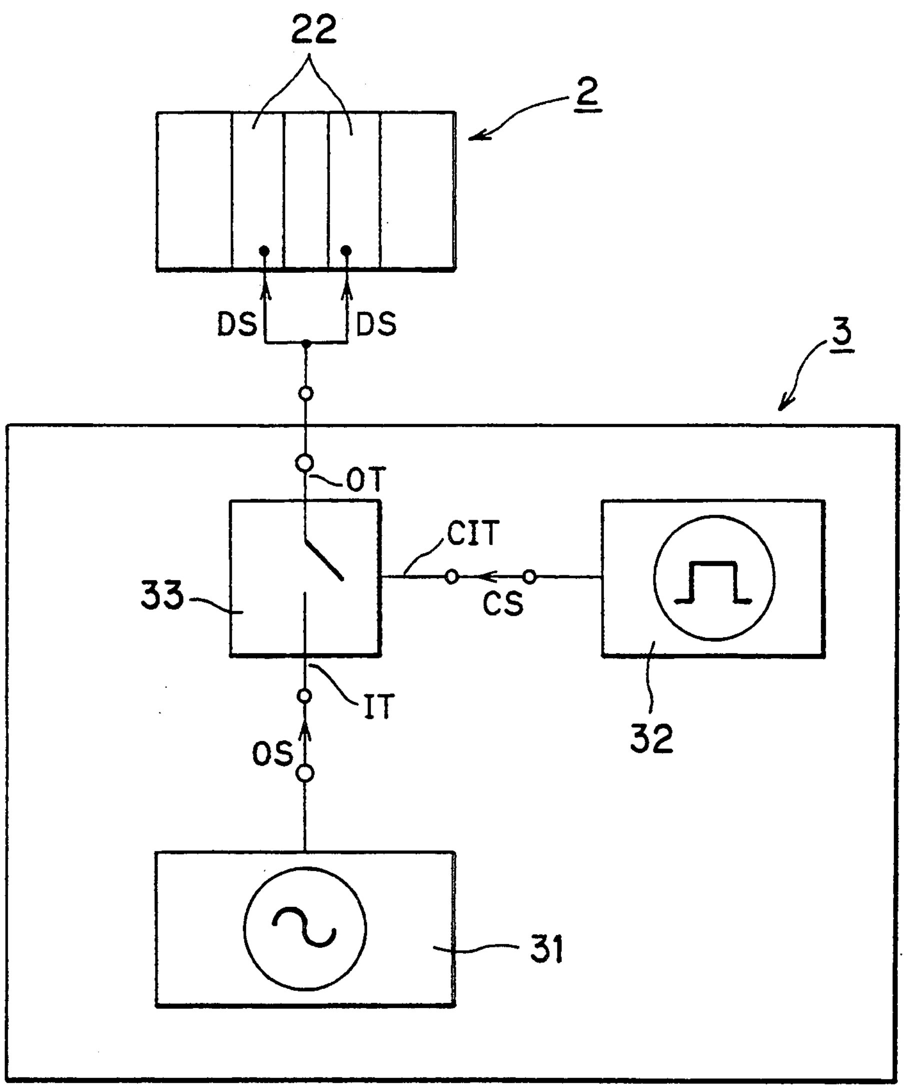
FIG. 3 is a block diagram showing a drive circuit 3 of the first embodiment which is electrically connected to the oscillating device 2.

The method for modulating the amplitude of the drive signal will be described below with reference to FIGS. 3 through 5. The piezoelectric elements 22 are electrically connected to a drive signal generator 3. The drive signal generator 3 outputs to the piezoelectric elements 22 a drive signal DS. As is shown in FIG. 3, the drive signal generator 3 includes an oscillator 31 which generates an AC electric oscillator signal OS with frequency fr [kHz], a timing controller 32 which produces a time control signal TCS having a high level and a low level, and a switching circuit 33 which switches the amplitude of the oscillator signal OS between ON and OFF. In other words, the switching circuit 33 turns the OS signal ON and OFF in accordance with the timing control signal TCS.

For example, the switching circuit 33 is formed with a switch input terminal IT and an output terminal OT, both of which are made from, for example, transistors. The switching circuit 33 is further formed with a control signal input terminal CIT. The timing controller 32 is electrically connected to the control signal input terminal CIT, and the oscillator 31 is electrically connected to the switch input terminal IT. When the timing control signal TCS from the timing controller 32 is the high level, the impedance between the switch input terminal IT and the output terminal OT will be low, whereby the switching circuit is ON so that the signal OS is transmitted to the oscillating device 2. Contrarily, when the timing control signal TCS from the timing controller 32 is the low level, the impedance between the switch input terminal IT and the output terminal OT will be high, whereby the switching circuit 33 is OFF so that the signal OS is not transmitted to the oscillating device 2. The switching circuit 33 outputs the signal OS to the oscillating device 2 as the drive signal DS.

Figure 4:
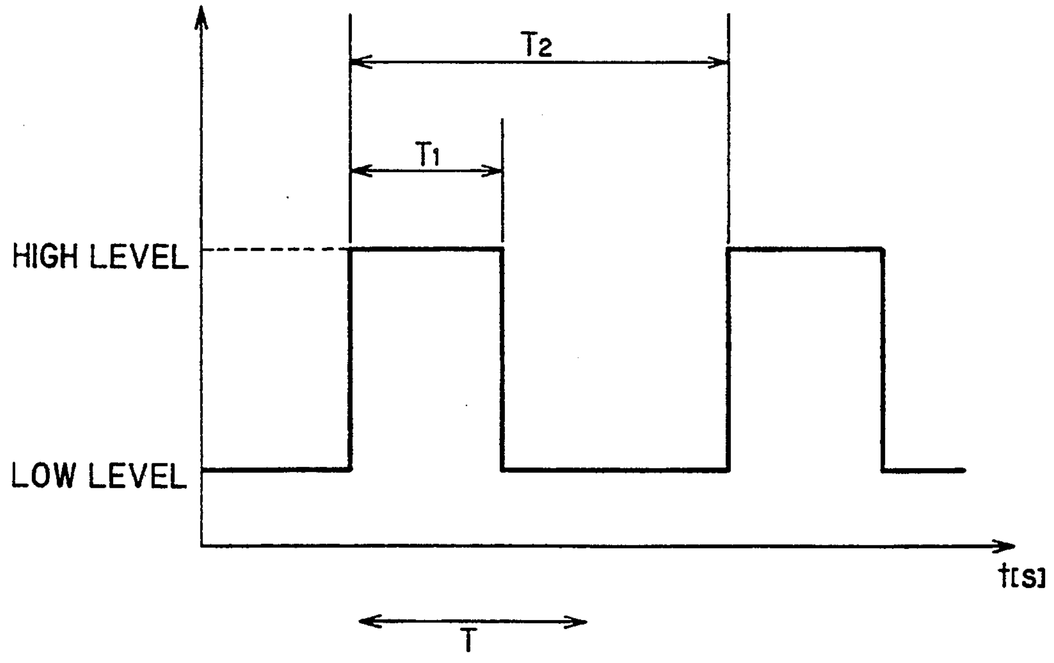
FIG. 4 is a graph showing a timing control signal TCS applied from a timing control circuit 32 to a switch circuit 33 of the drive circuit 3.
Figure 5:
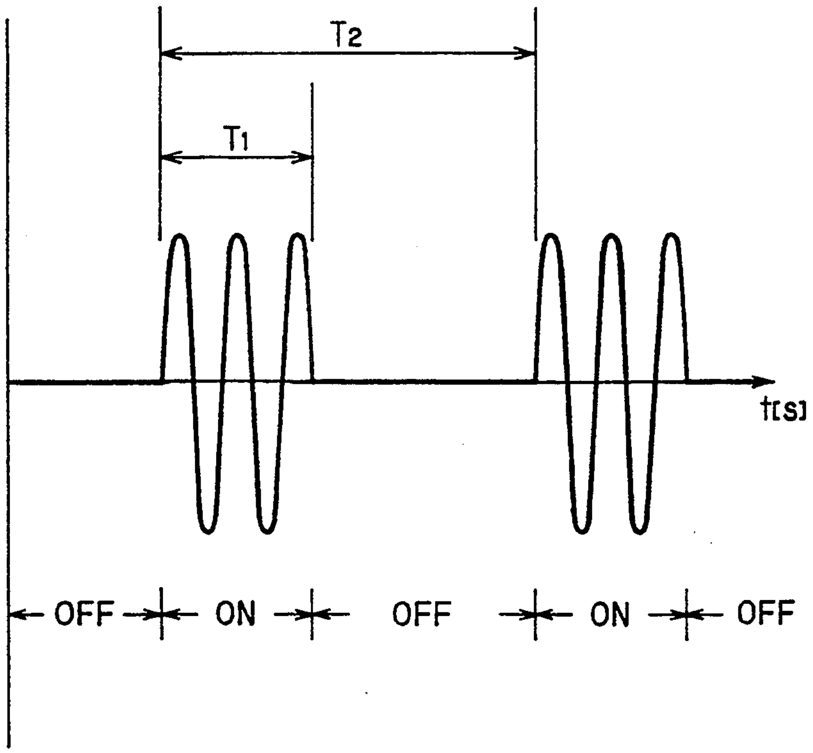
FIG. 5 is a graph showing a drive signal DS applied from the drive circuit 3 to the oscillating device 2.

FIG. 4 is a graph representing the rectangular wave of the timing control signal TCS. FIG. 5 is a graph representing the modulation of the amplitude of the drive signal DS, in other words, the turning ON and OFF of the signal OS, in accordance with the timing control signal TCS shown in FIG. 4.

If the frequency and duty ratio of the rectangular wave timing control signal TCS input to the switch circuit 33 are set so that the time T1 when the switch circuit 33 is ON is shorter than time T required for the incident wave produced by the oscillating device 2 to reflect off the reflection device 20 and return to the oscillating device 2, and moreover, the time T2 required to complete an ON-OFF cycle of the switch circuit 33 is longer than the time T required for the incident wave produced by the oscillating device 2 to reflect off the reflection device 20 and return to the oscillating device 2, then the incident waves will not overlap the reflected waves. For example, if the insulating layer 106 of the aperture electrode 1 is formed from a 25 [$\mu$m] thick polymide, the velocity v at which the vibration wave is propagated in the aperture electrode 1 is about 40 [m/s]. Accordingly, if a distance between the oscillating device 2 and the reflecting device 20 is 300 [mm], the time T required for the incident wave produced by the oscillating device 2 to reflect off the reflection device 20 and return to the oscillating device 2 will be about 15 [ms]. Setting the time T1 when the switch circuit 33 is ON at 10 [ms] and the time T2 to complete an ON-OFF cycle of the switch circuit 33 at 30 [ms] will satisfy the above conditions. Applying a rectangular wave timing control signal TCS with frequency of 33 [Hz] ($\approx 1/T2 = 1/(30 \times 10^{-3})$) and duty ratio of 33 [%] ($= T1/T2$) from the timing controller 32 to the switch circuit 33, the oscillating device 2 will not produce a set of incident waves until the previous set has reflected off the reflection device 20 and returned to the oscillating device 2, thus avoiding overlapping of the incident waves and reflected waves.

The aperture electrode 1 is mounted in the image recording portion 101 so that the base electrode layer 107 confronts the brush roller 103. The segmented control electrodes 108 individually surrounding each of the apertures 11 are electrically connected to a signal source S mounted in the image forming apparatus 100. The base electrode layer 107 is electrically grounded.

The operation of the image recording apparatus 100 of the invention will be described with reference to FIG. 1. First, an image formation start control signal is supplied to the image forming apparatus 101 from an external device (not shown in the drawing) and image signals are supplied to the signal source S also from the external device. The image recording medium P then enters the image forming apparatus 100 through the entrance 117, and is transported along the guide plate 115 by the feed rollers 116 into the image recording portion 101. In the image recording portion 101, the supply blade 111 presses the toner particles T onto the supply roller 104, and the supply roller 104 carries the toner particles T thereon. The supply roller 104 then supplies the toner particles T to the brush roller 103. The toner particles T are charged positively by contacting the supply roller 104 and the brush roller 103 by triboelectric effects. The positively charged toner particles T are carried by the brush roller 103.

The scratch member 110 which is provided below the aperture electrode 1 bends the bristles of the brush roller 103 in accordance with the rotation of the brush roller 103. A desired amount of the toner particles T spring up as the bent bristles of the brush roller 103 snap back to their original shape and position. Consequently, clouds of toner particles T are supplied to the aperture electrode 1 at its side on which the base electrode layer 107 is provided. The flow of toner particles T is regulated and modulated by selectively applying voltage to the segmented control electrodes 108 of the aperture electrode 1. Accordingly, a toner image corresponding to the image signals is formed on the image recording medium P which is then transported to the image fixing portion 102 before being discharged out from the exit 118.

While the aperture electrode performs the above-described toner modulating operation, the drive signal generator 3 applies to the piezoelectric elements 22 the drive signal DS. It is noted that the drive signal DS has its amplitude being modulated ON and OFF as shown in FIG. 5. Because incident waves from the oscillating device 2 will not exist at the aperture electrode 1 at the same time as reflected waves from the reflection device 20 exist, no standing waves are developed on the aperture electrode. Thus, the progressive wave is uniformly generated on the apertures 11, so that a large vibration acceleration is uniformly applied to the apertures 11. Since the large vibration acceleration produces a repulsion force sufficiently large for overcoming the image force occurred in the aperture electrode 1, the large vibration acceleration thus uniformly applied to the apertures will prevent toner particles T from attaching to any of the apertures. Thus, toner particles will not accumulate in any of the apertures. Consequently, the flow of the toner particles T is stably modulated by the signal source S, so that a clear toner image is recorded on the image recording medium P.

The back electrode 112 electrically connected to the negative electrode of the power source E2 electrostatically attracts the positively charged toner T. The toner particles T adhere to the image recording medium P which is now positioned between the aperture electrode 1 and the back electrode 112.

Then, the image recording medium P reaches the thermal fixing portion 102 where the toner images are fixed on the image recording medium P by the heat roller 113 and the press roller 114. This fixation of the images is performed by a known method. Finally, the image recording medium P bearing the toner images thereon is guided by another guide 115, and is discharged through the exit 118.

The operations of the drive signal generator 3 and the oscillating device 2 will be described in greater detail referring to FIGS. 3 through 5. The timing controller 32 outputs to the control signal input terminal CIT a timing control signal TCS which alternates between a high level and a low level as shown in FIG. 4. When the timing control signal TCS is at the high level, the switch circuit 33 is turned ON so that the oscillator 31 applies to the piezoelectric elements 22 an oscillating signal OS with the frequency fr [kHz]. The oscillating device 2 then vibrates or resonates in accordance with the oscillating signal OS (drive signal DS), in turn vibrating the aperture electrode 1. When the timing control signal CS is at the low level, the switch circuit 33 is turned OFF so that the oscillating signal OS is not transmitted to the piezoelectric elements 22. Consequently, the oscillating device 2, and subsequently the aperture electrode 1, does not vibrate. The ON-OFF cycle of the switch circuit 33 is regulated to prevent incident waves and reflected waves from appearing at the aperture electrode 1 simultaneously, thus preventing the overlap situation that generates standing waves.

Because no standing waves are produced in the aperture electrode 1, all areas near or at the row of apertures 12 receive vibration with the same amplitude. As can be seen by the following equation, vibration acceleration of a vibration is directly proportional to vibration amplitude of the vibration:

$$V=\{A(2\pi f)^2\}/G, \text{ where } G=9.8$$

where V=vibration acceleration [G (gravitational acceleration) ],

A=vibration amplitude [m], and f=vibration frequency [Hz].

Stated differently, when the vibration amplitude is high, the vibration acceleration is high. Therefore, because all areas near or at the row of apertures 12 receives vibration with the same amplitude, if the amplitude of the vibration is sufficiently high, all areas near or at the row of apertures 12 will receive a vibration acceleration sufficiently high to prevent toner particles from adhering to the aperture electrode 1, thus preventing blockage of the apertures. The higher the vibration acceleration, the greater the blockage prevention effectiveness. Therefore, to increase the blockage prevention efficiency, the amplitude and the frequency of the vibration applied to the aperture electrode should be increased, as apparent from the above equation. In general, when frequency of applied vibration is increased, the amplitude will decrease. For this reason, the value of the vibration frequency should be selected dependent on the material, etc. of the aperture electrode 1 to such a value that a maximum vibration acceleration can be obtained.

In the present embodiment, as described above, the electric switch (the combination of the elements 32 and 33 is employed for modulating the amplitude of oscillation of the oscillating device 2. However, the electric switch may be replaced with a mechanical switch. In fact, any method of effectively modulating the amplitude of the vibrating device could be used without affecting the effectiveness of this present invention.

Similarly, the oscillating device 2 (the combination of the resonating body 21 formed of metal and the piezoelectric elements 22) may be replaced by any method of effectively vibrating the aperture electrode 1. The oscillating device 2 may be replaced with a laminated piezoelectric element as is employed in the second and third embodiments which will be described later.

As described above, the image forming apparatus according to the first preferred embodiment will modulate the amplitude of vibration that the oscillating device 2 applies to the aperture electrode 1, thus preventing standing waves from being formed at the aperture electrode 1 so that the apertures and surrounding area receive vibration with amplitude sufficiently large to prevent the toner particles from accumulating in the apertures.

Referring to the accompanying FIG. 1 and FIGS. 6 through 9, a second preferred embodiment of the invention will be described below wherein like parts and components are designated by the same reference numerals to avoid duplication of description.

Figure 6:
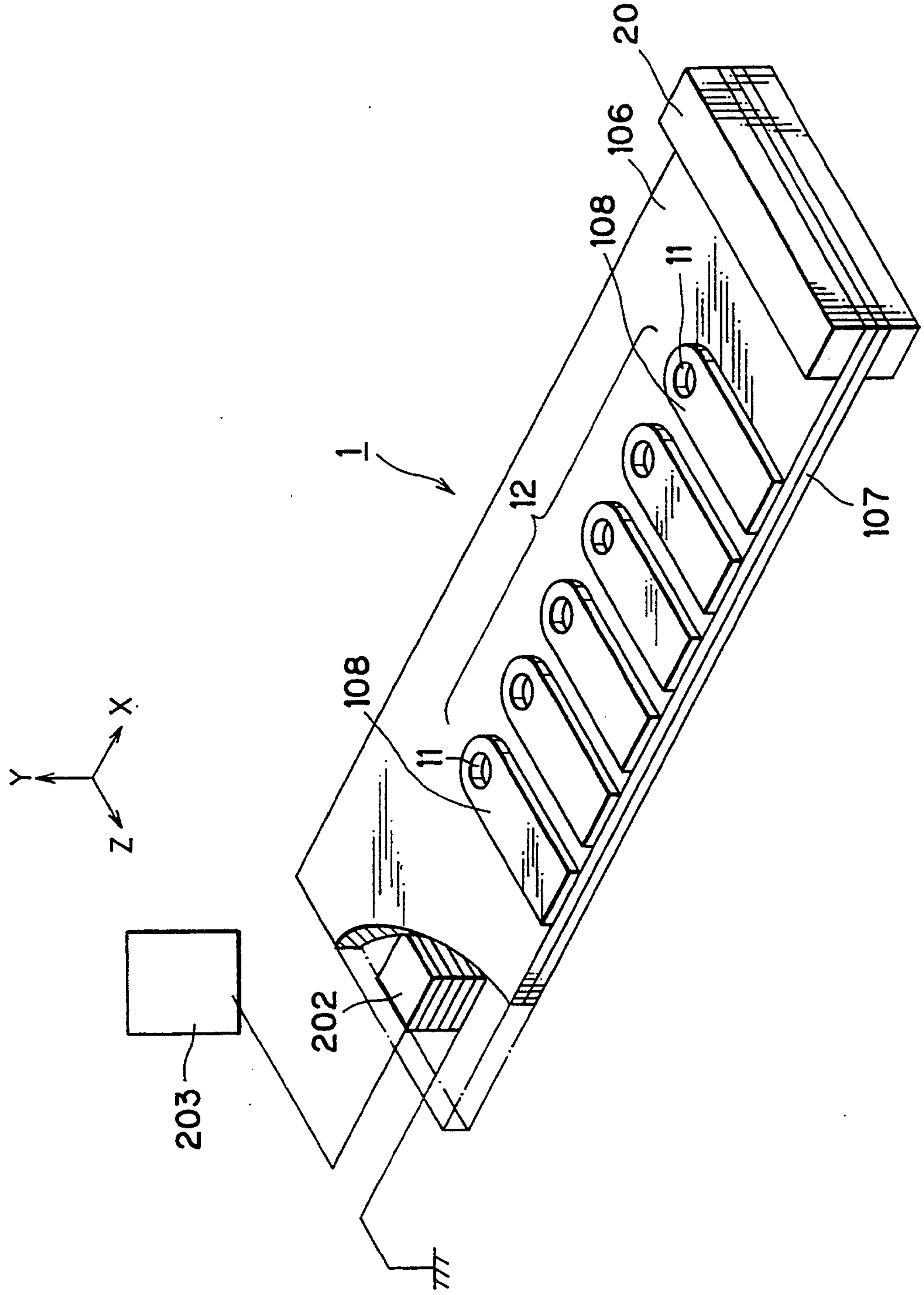
FIG. 6 is a perspective view of an aperture electrode according to a second embodiment of the present invention.
Figure 7:
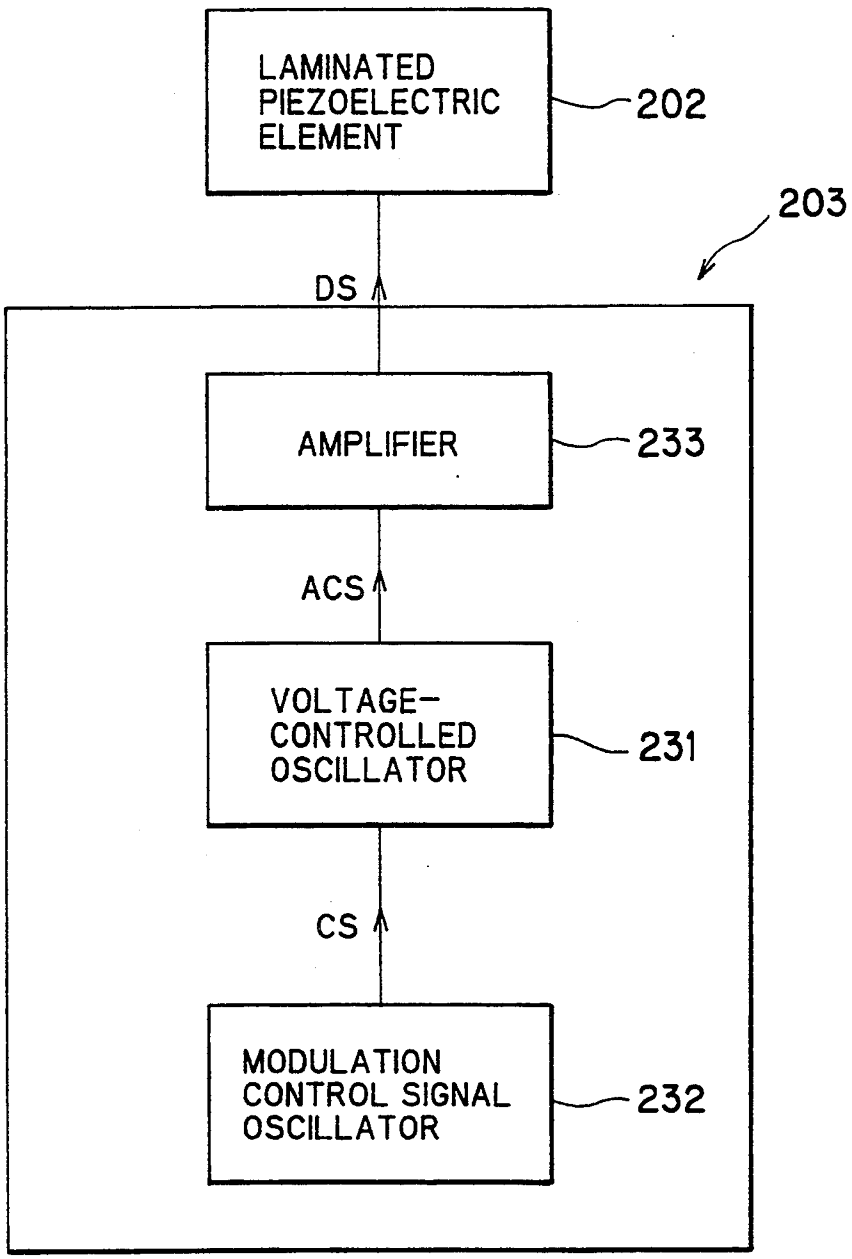
FIG. 7 is a block diagram showing a drive circuit 203 electrically connected to an oscillating device 202 of the second embodiment.

An image forming apparatus 100 according to the second preferred embodiment of the present invention is the same as the image forming apparatus 100 of the first preferred embodiment except for the oscillating device 2 and the drive signal generator 3, and therefore is schematically shown in FIG. 1. The image forming apparatus in the second embodiment employs an oscillating device 202 and a drive signal generator 203 as shown in FIGS. 6 and 7.

An oscillating device 202 of the second embodiment will be described by referring to FIG. 6. Similarly to the first embodiment, the vibrating device 202 is mounted on the aperture electrode 1 at one end of the aperture electrode 1 along the direction X in the drawing, that is, in the direction of a row of apertures 12. The vibrating device 202 serves to provide progressive waves to the aperture electrode 1. Similarly to the first embodiment, the reflecting device 20 is mounted on the aperture electrode 1 at the end opposing to the oscillating device 202. In the second embodiment, the oscillating device 202 is formed from a laminated piezoelectric element. The laminated piezoelectric element 202 is constructed to develop an expansion vibration in its laminated direction, i.e., in a direction indicated by an arrow Y in the drawing. The laminated piezoelectric element 202 is figured and sized so as to resonate in a lowest mode resonation with a certain value Fr [Hz] of frequency. In the present embodiment, the piezoelectric element 202 should be vibrated at such a frequency that is considerably lower than the lowest mode resonation frequency Fr. This insures that the oscillating device 202 does not resonate and vibrates at a fixed amplitude. This consequently insures that the vibration developed on the aperture electrode 1 maintains a fixed amplitude.

According to the second embodiment, drive signals for driving the oscillating device 202 are modulated in frequency so that the progressive waves formed by the vibration of the oscillating device and propagated along the aperture electrode are modulated in their frequencies.

Figure 8:
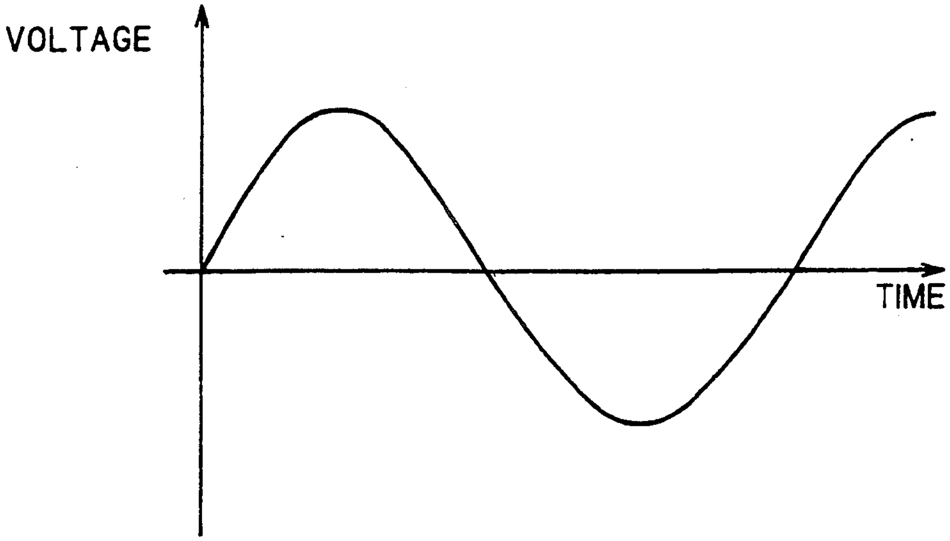
FIG. 8 is a graph showing control signal CS applied from a modulation control signal oscillator 232 to a voltage-controlled oscillator 231 of the drive circuit 203.

The method of modulating the frequency of the drive signal applied to the oscillating device 202, and consequently the frequency of vibration produced by the oscillating device, will be explained by referring to FIGS. 7 through 9.

The oscillating device 202 is electrically connected to a drive circuit 203. FIG. 7 is a block diagram showing the components of the drive circuit 203, their electrical connection to each other and to the oscillating device 202. The drive circuit 203 produces a drive signal DS and, as shown in FIG. 7, is formed from a voltage-controlled oscillator 231, a modulation control signal oscillator 232, and an amplifier 233, all for producing the drive signal DS. The modulation control signal oscillator 232 outputs a control signal CS to the voltage-controlled oscillator 231. The modulation control signal oscillator 232 outputs a control signal CS which causes the voltage-controlled oscillator 231 to modulate, in accordance with the voltage value of the control signal CS, frequency of an AC electric signal ACS outputted from the oscillator 231. The amplifier 233 receives and amplifies the frequency modulated AC signal ACS. The amplifier outputs the thus amplified signal ACS as the drive signal DS to the vibrating device 202.

The voltage-controlled oscillator 231 receives the control signal CS from the modulation control signal oscillator 232 and modulates the frequency of the AC electric signal ACS. FIG. 8 is a graph representing the voltage of the control signal CS applied to the voltage-controlled oscillator 231 fluctuating in a sine wave. When the voltage of the control signal CS applied to the voltage-controlled oscillator 231 fluctuates as shown in FIG. 8, the frequency of the AC electric voltage ACS outputted from the oscillator 231 and consequently the frequency of the drive signal DS applied to the oscillating device 202 fluctuates with time as shown in FIG. 9. That is, the drive signal DS becomes a signal with a sine wave modulated frequency.

As mentioned above, the oscillating device 202 is formed from a laminated piezoelectric element with its shape and dimension adjusted so that the lowest mode resonance frequency Fr is higher than all the values positioned in a range at which the frequency of the drive signal DS applied to the oscillating device 202 is varied. Differently stated, all values in the range of the frequency of the drive signal DS are much lower than the lowest mode resonance frequency Fr of the piezoelectric element 202. Since the piezoelectric element is vibrated at the frequency of the drive signal DS, it will not develop a resonance vibration when the frequency of the drive signal is modulated as shown in FIG. 9. Accordingly, the oscillating device 202 may develop a vibration with fixed amplitude. This is because if the frequency of the drive signal DS is modulated in the frequency range within which at least one resonance frequency of the piezoelectric element 202 falls, when the value of the frequency of the drive signal DS becomes equal or approximate to the resonance frequency value, the amplitude of the vibration developed on the piezoelectric element will increase considerably. Accordingly, the oscillating device 202 will not develop a vibration having a stable fixed amplitude.

Figure 9:
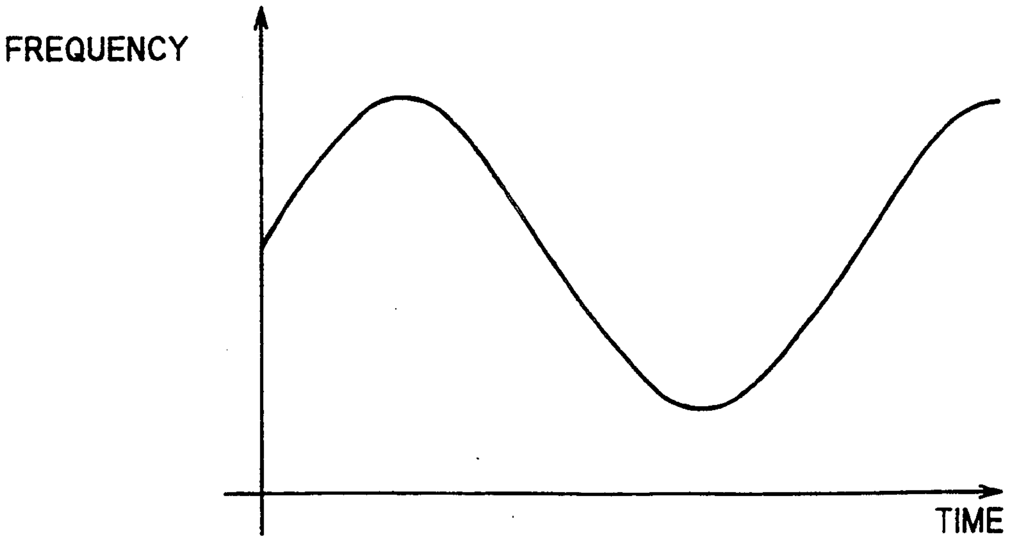
FIG. 9 is a graph showing a frequency-modulated drive signal DS applied from the drive circuit 203 to the oscillating device 202.

According to the present embodiment, by applying to the oscillating device 202 a drive signal DS with frequency modulated as shown in FIG. 9, the oscillating device 202 will apply incident waves to the aperture electrode 1 with frequency which differs from the frequency of the reflected waves reflected from the reflector 20. When the incident waves and the reflected waves overlap, their different frequencies will prevent the two types of waves from interfering with each other. More specifically, differences in frequencies and consequently differences in phases between the incident wave and the reflected wave change continually so that the two types of waves will not interfere with each other. Accordingly, no standing waves are formed on the aperture electrode 1. Toner particles that would otherwise adhere near the row of apertures 12 by image forces will be prevented from doing so by the large vibration acceleration of the incident waves or the reflected waves. Consequently the flow of toner particles T will be modulated stably by the signal source S.

The blockage prevention operation of the aperture electrode 1 will be described in greater detail by referring to FIGS. 7 through 9. The modulation signal control oscillator 232 applies a sine wave control signal CS as shown in FIG. 8 to the voltage-controlled oscillator 231. The voltage-controlled oscillator 231 outputs to the amplifier 233 an AC electric signal ACS with its frequency being modulated as shown in FIG. 9. The amplifier 233 amplifies the amplitude of the AC electric signal ACS, and outputs the thus amplified AC electric signal ACS as the drive signal DS to the oscillating device 202. The oscillating device 202 excites the aperture electrode 1 with vibration having modulated frequency as shown in FIG. 9. Accordingly, the frequency of incident waves and the frequency of reflected waves will always differ, where the two types of waves overlap. Accordingly, they will not interfere with each other, thereby preventing the formation of standing waves.

Therefore, all areas near or at the row of apertures 12 receive vibration with the same amplitude. If the amplitude of the vibration is sufficiently high, all areas near or at the row of apertures 12 will receive a vibration acceleration sufficiently high to prevent toner particles from adhering to the aperture electrode 1, thus preventing blockage of the apertures. As described already, the higher the vibration acceleration, the greater the blockage prevention effectiveness. Therefore, to increase the blockage prevention efficiency, the amplitude and the frequency of the vibration applied to the aperture electrode should be increased. In general, when an attempt is made to apply vibration with a high frequency, the amplitude will decrease. For this reason, the value of the vibration frequency should be selected in accordance with the material, etc. of the aperture electrode 1 to such a value that a miximum vibration acceleration may be obtained.

In the above description, the voltage-controlled oscillator 231 is employed for modulating the vibration frequency. However, the voltage-controlled oscillator can be replaced with any method that would effectively modulate the frequency of vibration to be produced by the oscillating device 202 without adversely affecting the effectiveness of the invention.

Similarly, the vibrating method of the oscillating device (the laminated piezoelectric element) can be replaced with other vibrating methods, such as a method of using magnetic forces, without adversely affecting the effectiveness of the invention.

As described above, the image forming apparatus according to the second embodiment will, by modulating the frequency of the vibration applied by an oscillating device to the aperture electrode, prevent standing waves from being formed at the aperture electrode. Areas of the aperture electrode near the apertures therefore receive vibration with a sufficiently large and uniform amplitude. Accordingly, the toner will not accumulate in the apertures.

Referring to the accompanying FIG. 1 and FIGS. 10 through 16, a third preferred embodiment of the invention will be described below wherein like parts and components are designated by the same reference numerals to avoid duplication of description.

The image forming apparatus 100 according to the third preferred embodiment of the present invention is the same as that of the second preferred embodiment except for the aperture electrode, the oscillating device and the drive signal generator, and therefore is schematically shown also by FIG. 1. In the present embodiment, an aperture electrode 301, an oscillating device 302 and a drive signal generator 203 or 430 are employed as shown in FIG. 10.

The aperture electrode 301 will be described below by referring to FIG. 10.

Figure 10:
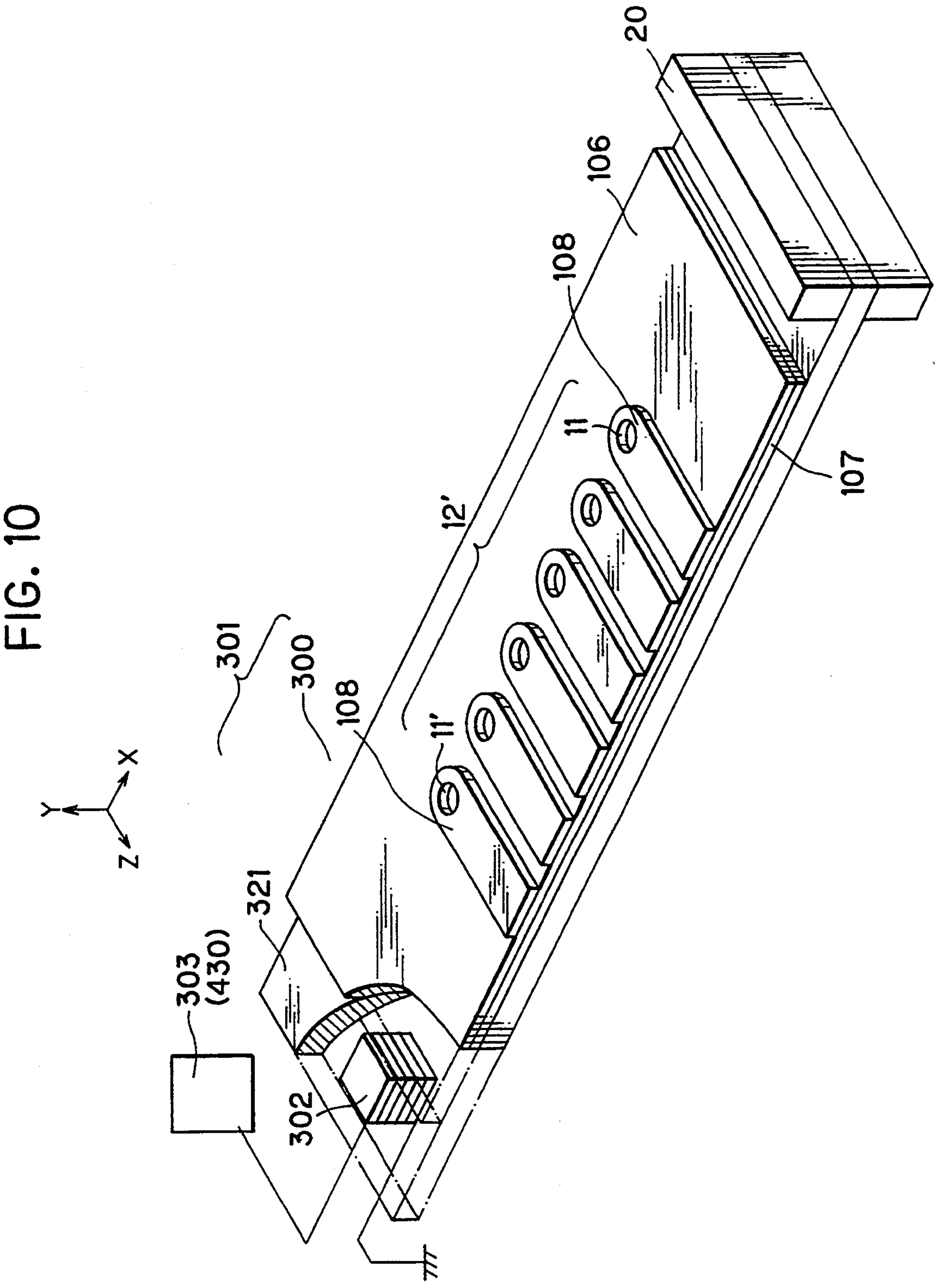
FIG. 10 is a perspective view of an aperture electrode according to a third embodiment of the present invention.

As shown in FIG. 10, the aperture electrode 301 includes an aperture electrode member 300 and a vibrating plate 321. Similarly to the aperture electrodes 1 of the first and second embodiments, the aperture electrode member 300 includes the insulating layer 106 sandwiched between the base electrode layer 107 and the multiple segmented control electrode 108. The multiple segmented control electrode 108 extends in a row in the longitudinal direction of the aperture electrode member 300 indicated by an arrow X in the drawing. A vibrating plate 321 is attached to the base electrode layer 107 of the aperture electrode member 301. The aperture electrode 301 is formed with a plurality of apertures 11′. Each of the apertures 11′ penetrates through a corresponding segment of the segmented control electrode 108, the insulating layer 106, the base electrode layer 107 and also the vibrating plate 321. The plurality of apertures 11′ form a row of apertures 12′.

The vibrating plate 321 is vibrated by the oscillating device 302 by methods which will be described later. The aperture electrode member 300 vibrates with the vibrating plate 321. The vibrating plate 321 is formed from a rectangular metal plate having two resonance modes at two frequencies fm (Hz) and fn (Hz) where fm<fn. At one end of the vibrating plate 321, as determined by the row of apertures 12′, is mounted an oscillating device 302 which oscillates the vibrating plate 321. The oscillating device 302 produces incident vibration wave for propagation in the vibrating plate 321 in a direction along the row of apertures 12′. At the end of the vibrating body 321 opposing the oscillating device 302 is mounted the reflection device 20 for reflecting the incident vibration wave propagated from the oscillating device 302, similarly to the first and second embodiments.

The oscillating device 302 is formed, similarly to the oscillating device 202 in the second preferred embodiment, from a laminated piezoelectric element. The piezoelectric element is operated to excite expansion vibration in the direction indicated by the arrow labeled Y in FIG. 10. Also in the present embodiment, the piezoelectric element is vibrated so that the frequency of the vibration may vary. It is noted that the range of the vibration frequency at which the piezoelectric element is oscillated is much lower than the resonance frequency Fr [Hz] at which the piezoelectric element resonates the lowest mode expansion vibration. This insures that the oscillating device 302 does not develop a resonance vibration while the frequency of the vibration is varied and therefore that the oscillating device 302 maintains a vibration having a fixed amplitude.

The aperture electrode 301 is mounted in the image forming apparatus so that the vibrating plate 321 confronts the brush roller 103.

According to the present embodiment, the oscillating device 302 is supplied with a drive signal with a modulated frequency. As will be described later, in a first example of the present embodiment, the frequency of the drive signal is modulated in a sweep within a frequency range r defined between the frequencies f1[Hz] and f2 [Hz] where f1<fm and f2>fn (i.e., f1<fm<fn<f2). The frequency of progressive waves developed on the vibrating plate is therefore swept in the range r, so that two resonance mode vibrations having the resonance frequencies fm and fn are alternately produced on the vibrating plate. In a second example of the present embodiment, the frequency of the drive signal is modulated to switch between two frequency values f3 [Hz] and f4 [Hz] where f3=fm and f4=fn. The frequency of progressive waves developed on the vibrating plate is therefore switched between the two values fm and fn, so that the two resonance mode vibrations are alternately produced.

The first example of the present embodiment will be described below, with reference to FIGS. 11 through 13.

Figure 11:
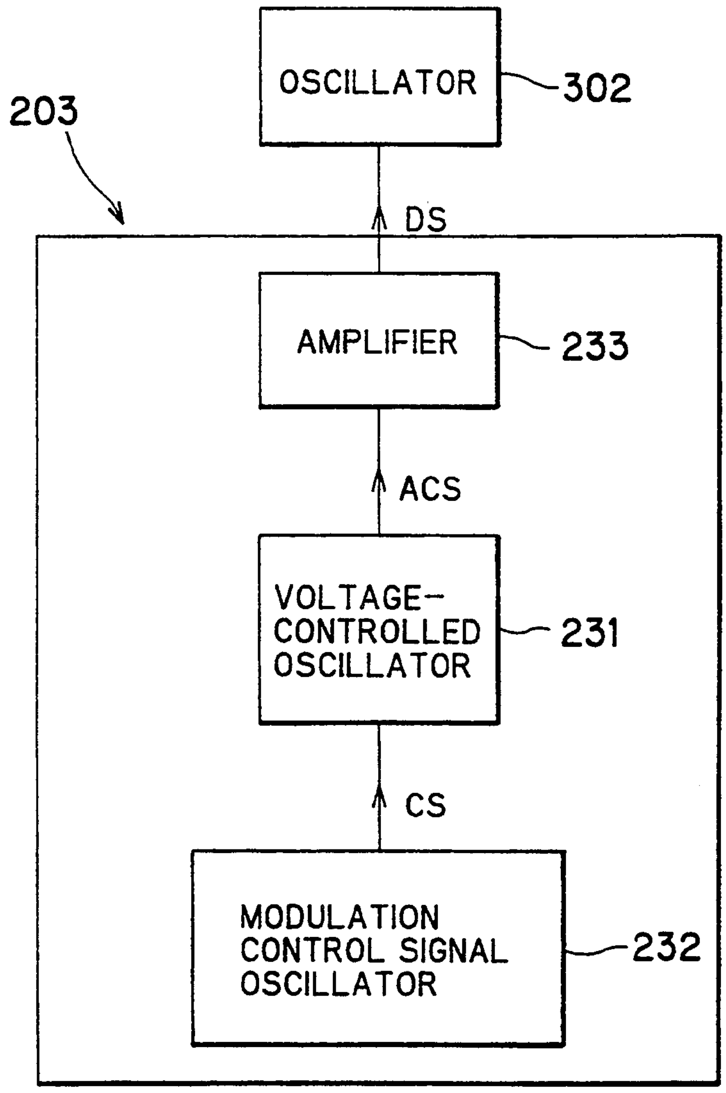
FIG. 11 is a block diagram showing a drive circuit 203, which is electrically connected to an oscillating device 302, according to a first example of the third embodiment.

To sweep the frequency of the drive signal applied to the oscillating device 302, the oscillating device 302 is electrically connected to a drive circuit 203 as shown in FIG. 11. The drive circuit 203 produces a drive signal DS for driving the oscillating device 302. Similarly to the drive circuit 203 of the second embodiment, the drive circuit 203 is formed from the modulation control signal oscillator 232, the voltage-controlled oscillator 231, and the amplifier 233. The modulation control signal oscillator 232 outputs a control signal CS to the voltage-controlled oscillator 231. The voltage-controlled oscillator 231 outputs an AC electric signal ACS to the amplifier 233. The frequency of the AC electric signal ACS is modulated in accordance with the voltage value of the signal CS. The amplifier 233 amplifies the AC electric signal ACS, and outputs the amplified signal ACS as the drive signal DS to the oscillating device 302.

Figure 12:
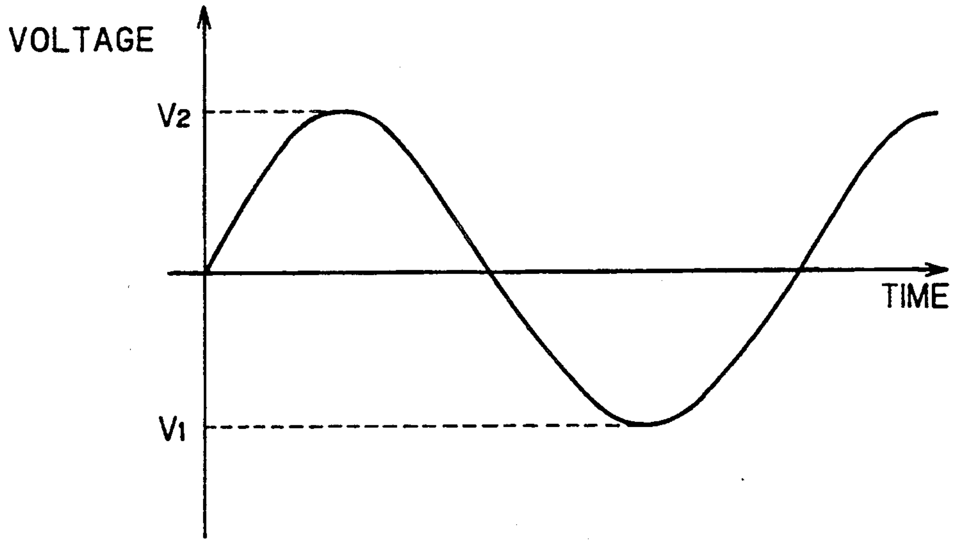
FIG. 12 is a graph showing control signal CS applied from a modulation control signal oscillator 232 to a voltage-controlled oscillator 231 of the drive circuit 203.

FIG. 12 is a graph representing the voltage value of the control signal CS applied to the voltage-controlled oscillator 231 which fluctuates in a sine wave in a range between V1 and V2. When voltage of the control signal CS applied to the voltage-controlled oscillator 231 fluctuates as shown in FIG. 12, the frequency of the AC electric signal ACS (and subsequently the drive signal DS applied to the oscillating device 302) sequentially changes with time between a first frequency f1 and a second frequency f2 as shown in FIG. 13. The first frequency f1 and second frequency f2 correspond to the voltage values V1 and V2, respectively. In other words, the drive signal DS has a waveform having a modulated frequency.

In the first example, the first frequency f1 and the second frequency f2 should be selected to satisfy the following formulas:

$$f1<fm \text{ and } f2>fn$$

Figure 13:
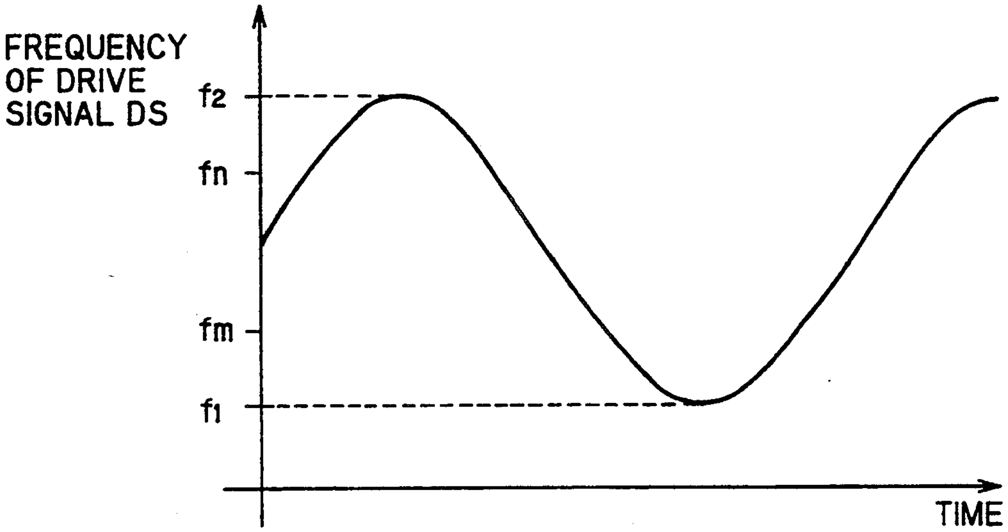
FIG. 13 is a graph showing a frequency-modulated drive signal DS applied from the drive circuit 203 to the oscillating device 302.

Therefore, by applying to the oscillating device 302 the driving signal DS with its frequency sweepingly modulated within the range r between the frequencies f1 and f2 as shown in FIG. 13, the vibrating device 302 will apply incident waves to the aperture electrode 301 with frequency varied in the range between the frequencies f1 and f2. Accordingly, the two resonance vibrations having the resonance frequencies fm and fn are alternately produced on the vibrating plate 321. Because the aperture electrode member 300 vibrates along with the vibrating plate 321, the two resonance vibrations are produced also in the aperture electrode member 300. As a result, two types of standing waves corresponding to the two resonance vibrations are alternately produced on the vibrating plate and therefore on the aperture electrode. Since the positions of nodes of the two types of standing waves are determined dependent on the corresponding frequencies fm and fn, the positions of the nodes differ. Accordingly, the nodes of the standing waves move on the vibrating plate (i.e., the aperture electrode) between two positions corresponding to the frequencies fm and fn. Thus, the nodes will not stay at fixed positions on the vibrating plate (aperture electrode).

It is noted that the value of the frequency f2 is selected to have a value much lower than the value of the resonance frequency Fr at which the oscillating device (piezoelectric element) 302 excites its lowest mode vibration, as described already. Accordingly, any value of frequency falling within the range r defined between the frequencies f1 and f2 is much lower than the resonance frequency of the oscillating device 302 of its lowest mode vibration. Accordingly, while the frequency of the drive signal DS applied to the oscillating device is swept between the frequencies f1 and f2, the oscillating device will not develop any mode of resonance oscillation and will not greatly increase the amplitude of oscillation. Thus, the amplitude of oscillation developed by the oscillating device will be fixed.

The drive circuit 203 and the oscillating device 302 are operated, as will be described below.

The modulation control signal oscillator 232 applies the control signal CS of sine wave form as shown in FIG. 12 to the voltage-controlled oscillator 231. The voltage-controlled oscillator 231 outputs to the amplifier 233 an AC electric signal ACS with its frequency modulated as shown in FIG. 13. The amplifier 233 amplifies the AC electric signal ACS and applies it as the drive signal DS to the oscillating device 302. The oscillation device 302 develops expansion vibration with its frequency swept between the frequencies f1 and f2. Accordingly, incident vibration waves with frequency swept between the values f1 and f2 are propagated along the vibrating plate 321. As a result, reflection vibration wave with frequency also swept between the values f1 and f2 are produced by the reflector 20 and propagated along the vibrating plate 321 back to the oscillating device 302. Because the two resonant frequencies fm and fn at which the vibrating plate 321 resonates is within the range r at which the frequency of the drive signal DS is swept, incident vibration waves with frequency fm and incident vibration waves with frequency fn are produced and propagated along the vibrating plate 321 while the frequency of the signal DS is swept. When the incident vibration wave with frequency fm is propagated in the vibrating plate 321, the reflector 20 produces reflective vibration wave with frequency fm. The incident and reflective vibration waves of frequency fm overlap to produce a resonant standing wave having a large amplitude oscillation. Similarly, when the incident vibration wave with frequency fn is propagated in the vibrating plate 321, the reflector 20 produces a reflective vibration wave of frequency fn, and the incident and reflective vibration waves overlap to produce another resonant standing wave having a large amplitude oscillation. Accordingly, while the frequency of the signal DS sweeps between the frequencies f1 and f2, the vibrating plate 321 is vibrated as if the two types of standing waves having the large amplitude oscillations were alternately oscillated in the vibrating plate. The nodes of the two types of standing waves move between the corresponding positions, and therefore continually move. Because the aperture electrode member 300 vibrates along with the vibrating plate 321, the toner particles T will not accumulate in the apertures 11' at any one position thereof.

It is noted that in the second embodiment, the frequency of the drive signal DS applied to the oscillating member 202 is varied at a very high rate so that the incident vibration wave propagated from the oscillating device 202 and the reflective vibration wave propagated back from the reflecting member 20 may have different frequencies when they overlap. Accordingly, although the incident and reflective vibration waves overlap, they do not interfere with each other and produce no standing waves. The frequency of the drive signal DS is varied, in the present example of the third embodiment, at a rate small in comparison with that in the second embodiment. Accordingly, in the present example, the frequencies of the incident and reflective vibration waves are sometimes equal when the incident and reflective waves meet. The incident and reflective vibration waves interfere with each other when they overlap. Since the frequency range r in which the frequency is sweepingly varied includes the two resonant frequencies fm and fn of the vibrating plate 321, standing waves at the two resonance modes are alternately produced on the vibrating plate, so that the nodes of the standing waves are always moved between the two positions corresponding to the two resonance modes.

The second example of the present embodiment will be described, hereinafter, with reference to FIGS. 14 through 16.

Figure 14:
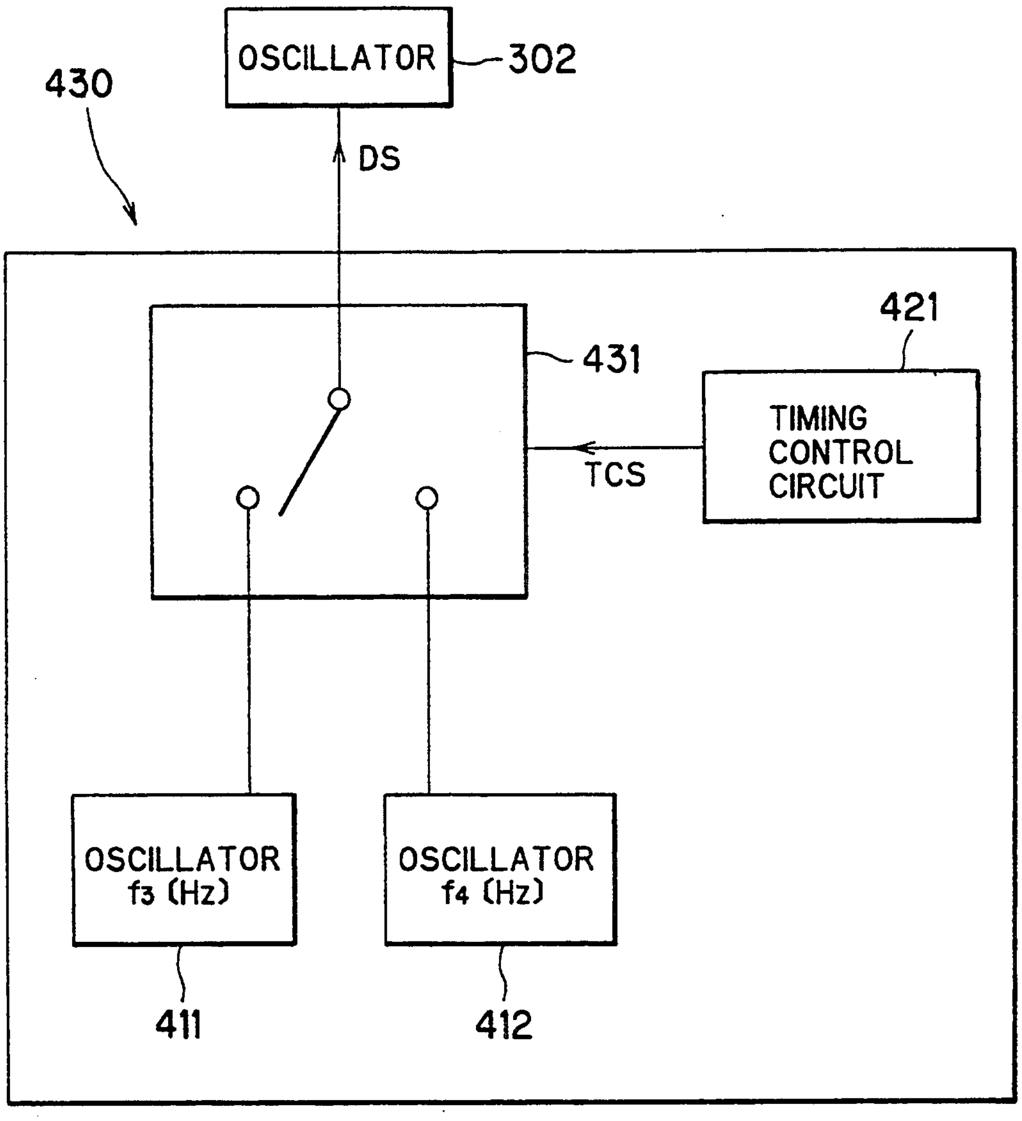
FIG. 14 is a block diagram showing a drive circuit 430, which is electrically connected to the oscillating device 302, according to a second example of the third embodiment.

In the second example, to switch frequency of the drive signal applied to the oscillating device 302, the oscillating device 302 is electrically connected to a drive circuit 430 shown in FIG. 14. The drive circuit 430 includes a first oscillator 411 for generating an AC electric oscillator signal having a third frequency f3 (Hz), a second oscillator 412 for generating an AC electric oscillator signal having a forth frequency f4 (Hz) (where f4>f3), a timing controller 421 for producing a timing control signal TCS which switches between a high level and a low level at a predetermined time interval, and a switching circuit 431 for switching between the AC oscillator signals from the first oscillator 411 and the second oscillator 412 in accordance with the level of the timing control signal TCS. More specifically, the timing controller 421 applies to the switching circuit 431 the timing control signal TCS which has a rectangular wave form as shown in FIG. 15. The drive circuit 430 therefore applies to the oscillating device 302 the drive signal DS with its frequency being switched between the frequencies f3 and f4 as shown in FIG. 16.

In this example, the frequencies f3 and f4 should satisfy the following formulas:

f3=fm and f4=fn

By applying to the oscillating device 302 the drive signal DS with frequency switched between the values of f3 and f4, similarly to the first example, the two types of resonance vibrations having the resonance frequencies fm and fn are alternately developed on the vibrating plate 321. In other words, two types of standing waves are alternately developed on the vibrating plate 321. Since the two types of standing waves have node-positions that differ, the nodes of the standing waves move between two corresponding positions. Thus, the nodes of the standing waves do not stay at fixed positions on the vibrating plate, i.e., on the aperture electrode.

Similarly to the first example, it is noted that the frequency f4 is selected to have a value much lower than the value of the frequency Fr at which the oscillating device 302 develops its lowest mode resonation oscillation. Accordingly, while the drive signal DS applied to the oscillation device 302 is switched between the frequencies f3 and f4, the oscillating device 302 will not develop any mode of resonation oscillation and therefore will not largely increase its oscillation amplitude. Thus, the amplitude of oscillation developed by the oscillating device can be fixed.

The driving circuit 430 and the oscillating device 302 are operated, as will be described below.

Figure 15:
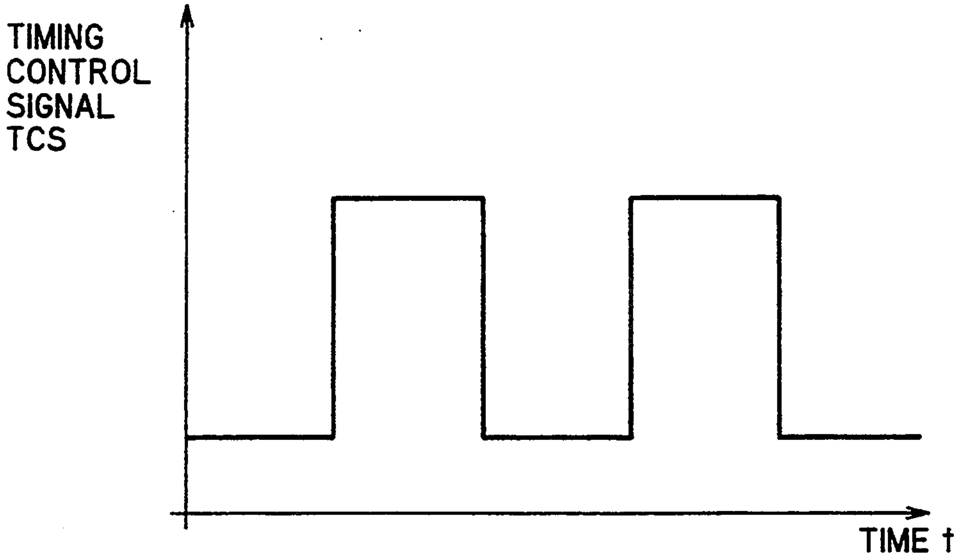
FIG. 15 is a graph showing timing control signal TCS applied from a timing control circuit 421 to a switch circuit 431 of the drive circuit 430.
Figure 16:
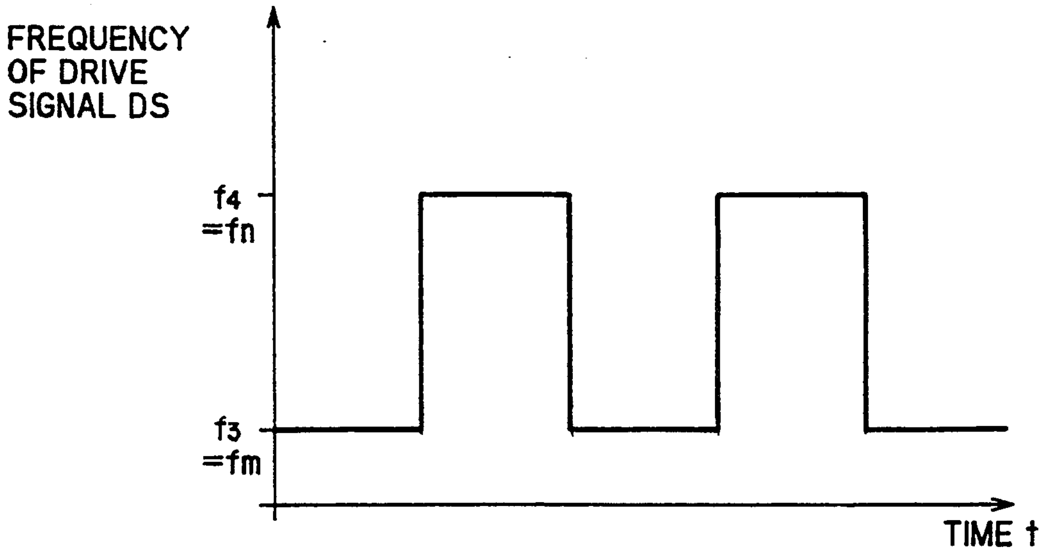
FIG. 16 is a graph showing a drive signal DS applied from the drive circuit 430 to the oscillating device 302.

When the switch circuit 431 is supplied from the timing controller 421 with the timing control signal TCS as shown in FIG. 15, the drive signal DS switches between the frequencies f3 and f4 as shown in FIG. 16. When the signal DS with frequency thus switched is applied to the oscillating device 302, the oscillating device 302 will alternately produce two types of vibrations having the frequencies f3 and f4, so that two types of incident vibration waves having the frequencies f3 and f4 are alternately produced and propagated along the vibration plate 321. When the oscillating device produces the incident vibration wave with frequency f3, the reflector 20 produces reflective vibration wave with frequency f3. The incident and reflective waves overlap to produce a standing wave. Because the frequency f3 is equal to the resonant frequency fm at which the vibrating plate resonates, standing waves thus formed will attain a large amplitude oscillation. Similarly, when the incident wave of frequency f4 propagates along the vibrating plate, the reflector 20 produces a reflective wave of frequency f4. The incident and reflective waves overlap to develop another standing wave. Because the frequency f4 is equal to another resonant frequency fn at which the vibrating plate resonates in another mode, the standing wave will also attain a large amplitude oscillation. Accordingly, the two types of standing waves corresponding to the frequencies fm and fn are alternately developed on the vibrating plate. Because nodes of the two standing waves are at different positions, the nodes of the standing waves always move between the corresponding positions and do not stay at fixed positions. Because the aperture electrode 300 vibrates along with the vibrating plate 321, the toner particles T will not accumulate the apertures 11' at any one position thereof.

As described above, according to the first and second examples of the present embodiment, nodes of the standing waves produced on the aperture electrode will always move. Accordingly, the standing waves uniformly apply a large vibration acceleration to an entire area of the aperture electrode. Thus, toner particles that would otherwise adhere near the row of apertures 12' by image forces and the like will be prevented from doing so by the large vibration acceleration.

Thus, according to the third embodiment of the present invention, the aperture electrode 301 is vibrated according to the signal DS as described in either the first or second example of the third preferred embodiment, the nodes of standing waves will constantly move so that the entire row of apertures 12' receives vibration with a sufficiently large amplitude. In other words, the vibration with a sufficiently large amplitude is provided to all the apertures 11' regardless of their position on the aperture electrode 301, and therefore the maximum vibration acceleration is applied to all the apertures 11'. Thus, toner particles T do not attach to areas around the apertures 11', as a result of which blockage of the apertures can be prevented. As described already, the higher the vibration acceleration, the greater the blockage prevention effectiveness. Therefore, to increase the blockage prevention efficiency, the amplitude and the frequency of the vibration applied to the aperture electrode should be increased. In general, when vibration frequency is increased amplitude will decrease. For this reason, the vibration frequency should have a value suitable for maximizing the vibration acceleration.

It is noted that instead of modulating the vibration frequency with the voltage-controlled oscillator 231, as described in the second preferred embodiment, any method that would effectively vary the frequency of vibration from the oscillating device 302 may be used without adversely affecting the effectiveness of the invention.

Instead of switching the frequency of vibration from the oscillating device 302 using the timing control signal from the timing controller 421, any method that would effectively switch the frequency of vibration from the oscillating device 302 could be used without adversely affecting the effectiveness of the invention.

Also, instead of the oscillating device formed from the laminated piezoelectric element, as described in the second preferred embodiment, the aperture electrode could be vibrated by other methods as well, such as by magnetic forces, without adversely affecting the effectiveness of the invention.

In the above description, the vibrating plate 321 is excited with vibration waves with frequency modulated so that two resonance modes develop on the vibrating plate. However, the vibrating plate may be excited so that three or more resonance modes develop on the vibrating plate. That is, the frequency of the vibration applied to the vibrating plate may be changed in such a frequency range as includes three or more resonant frequencies at which the vibrating plate will resonate. Or otherwise, the frequency of vibration may be switched among the three or more resonant frequencies.

Furthermore, the vibrating plate 321 may be omitted, similarly as in the first and second embodiments. The oscillating member 302 may directly oscillate the aperture electrode member 300. In this case, the frequency of the drive signal DS applied to the oscillating member should be varied in a sweeping manner in such a range as includes at least two resonance frequencies at which the aperture electrode member resonates. Or otherwise, the frequency of the drive signal should be switched between at least two resonance frequencies of the aperture electrode member.

In the present embodiment, a single oscillating member 302 is mounted on the vibrating plate 321, and therefore the oscillating member is controlled to alternately produce the vibrations of the two resonance frequencies fm and fn. However, at least two oscillating members may be mounted on the vibrating plate. In such a case, the at least two oscillating members may be controlled to simultaneously oscillate vibrations of the at least two resonance frequencies for the vibrating plate.

As apparent from the above description, in the third embodiment of the present invention, nodes of standing waves formed on the aperture electrode constantly moves. Therefore, all the areas around apertures of the aperture electrode will receive vibration with amplitude sufficiently large to prevent toner from accumulating on and clogging up the apertures.

While the invention has been described in detail with reference to the first through third embodiments thereof, it would be apparent to those skilled in the art that various changes and modifications may be made therein without departing from the spirit or scope of the invention.

What is claimed is:

1. An image forming apparatus for forming a toner image on image recording medium, comprising:

an aperture electrode for modulating electrically charged toner particles to be applied on image recording medium to thereby form a toner image on the image recording medium, said aperture electrode having a first end and a second end opposite to said first end;

oscillating means for causing said aperture electrode to vibrate, comprising:

an exciting member for exciting an incident vibration wave to be propagated in said aperture electrode, said exciting member being connected to said first end of said aperture electrode; and a reflecting member for reflecting the incident vibration wave propagated along said aperture electrode to form a reflective vibration wave to be propagated along said aperture electrode back to the exciting member, said reflecting member being connected to said second end of said aperture electrode; and modulating means for modulating vibration properties of the vibration caused by said oscillating means.

2. The image forming apparatus as claimed in claim 1, wherein said modulating means prevents the incident wave and the reflective vibration wave from producing a standing wave having a node on a fixed position on said aperture electrode.

3. The image forming apparatus as claimed in claim 2, wherein said modulating means includes amplitude modulating means for modulating amplitude of the vibration caused by said oscillating means.

4. The image forming apparatus as claimed in claim 3, wherein said modulating means includes overlap preventing means for preventing the incident vibration wave and the reflective vibration wave from overlapping.

5. The image forming apparatus as claimed in claim 4, wherein said modulating means includes amplitude modulating means for causing amplitude of one of the overlapping incident vibration wave and the reflective vibration wave to be zero.

6. The image forming apparatus as claimed in claim 5, wherein said amplitude modulating means include selection means for intermittently producing the incident vibration wave.

7. The image forming apparatus as claimed in claim 3, wherein said modulating means includes frequency modulating means for modulating frequency of the vibration caused by said oscillating means.

8. The image forming apparatus as claimed in claim 7, wherein said aperture electrode resonates at an at least first and second frequencies, and wherein the frequency modulating means varies the frequency of the vibration caused by said oscillating means within a frequency range which includes the at least first and second frequencies.

9. The image forming apparatus as claimed in claim 7, wherein said modulating means includes standing wave preventing means for preventing the incident and reflective vibration waves from producing the standing wave when the incident and reflective vibration wave overlap.

10. The image forming apparatus as claimed in claim 9, wherein said standing wave preventing means includes interference preventing means for preventing the overlapping incident and reflective vibration waves from interfering with each other.

11. The image forming apparatus as claimed in claim 10, wherein said interference preventing means includes frequency changing means for allowing the frequencies of the overlapping incident and reflective vibration waves to differ.

12. The image forming apparatus as claimed in claim 11, wherein said frequency changing means varies the frequency of the incident vibration wave in a sweeping manner.

13. The image forming apparatus as claimed in claim 7, wherein said aperture electrode resonates at an at least first and second frequencies, and wherein the frequency modulating means switches the frequency of the vibration caused by said oscillating means between the at least first and second frequencies.

14. The image forming apparatus as claimed in claim 7, wherein said modulating means includes means for preventing a node of a standing wave produced by the overlapping incident and reflective vibration waves from being positioned on a fixed position on said aperture electrode.

15. The image forming apparatus as claimed in claim 14, wherein the node preventing means includes means for alternately producing, on said aperture electrodes, at least two resonant standing waves which have their nodes at different positions.

16. The image forming apparatus as claimed in claim 1, further comprising a vibrating member mounted on said aperture electrode for allowing said aperture electrode to vibrate along with said vibrating member, wherein said oscillating means causes said vibrating means to vibrate and said modulating means modulates vibration properties of the vibration caused by said oscillating means.

17. An image forming apparatus for forming a toner image on image recording medium, comprising:

an aperture electrode for modulating electrically charged toner particles to be applied to image recording medium to thereby form a toner image on the image recording medium;

a vibrating member having at least a first and second resonance mode at which the vibrating member resonates at a first and second resonant frequency and a first side and a second side opposing the first side, said first side of said vibrating member being mounted on said aperture electrode for allowing said aperture electrode to vibrate along with said vibrating member, said vibrating member resonating with said at least first and second resonant frequencies, said second side of said vibrating member comprising an outer most side of said aperture electrode and said vibrating member facing in a direction away from the image recording medium; and oscillating means for causing said vibrating member to vibrate at frequencies which include the at least first and second resonant frequencies, the oscillating means being connected to said vibrating member.

18. The image forming apparatus as claimed in claim 17, wherein said oscillating means includes:

an oscillating member for oscillating said vibrating member at a frequency; and frequency modulating means for changing the frequency at which the oscillating member oscillates said vibrating member, the frequency modulating means varying the frequency in a sweeping manner within a range which includes the at least two resonant frequencies of said vibrating member.

19. The image forming apparatus as claimed in claim 17, wherein said oscillating means includes:

an oscillating member for oscillating said vibrating member at a frequency; and frequency modulating means for switching the frequency at which the oscillating member oscillates said vibrating member between the at least first and second resonant frequencies of said vibrating member.

20. An image forming apparatus for forming a toner image on image recording medium, comprising:

an aperture electrode for modulating electrically charged toner particles to be applied on image recording medium to thereby form a toner image on the image recording medium;

oscillating means for causing said aperture electrode to vibrate, wherein said oscillating means include an exciting member for exciting an incident vibration wave to be propagated in said aperture electrode and a reflecting member for reflecting the incident vibration wave propagated along said aperture electrode to form a reflective vibration wave to be propagated along said aperture electrode back to the exciting member; and modulating means for modulating vibration properties of the vibration caused by said oscillating means comprising amplitude modulating means for modulating amplitude of the vibration caused by said oscillating means and overlap preventing means for preventing the incident vibration wave and the reflective vibration wave from overlapping, wherein said modulating means prevents the incident wave and the reflective vibration wave from producing a standing wave having a node on a fixed position on said aperture electrode.

21. The image forming apparatus of claim 20, wherein said modulating means includes amplitude modulating means for causing amplitude of one of the overlapping incident vibration wave and the reflective vibration wave to be zero.

22. The image forming apparatus of claim 21, wherein said amplitude modulating means include selection means for intermittently producing the incident vibration wave.

23. An image forming apparatus for forming a toner image on image recording medium, comprising:

an aperture electrode for modulating electrically charged toner particles to be applied on image recording medium to thereby form a toner image on the image recording medium;

oscillating means for causing said aperture electrode to vibrate, wherein said oscillating means include an exciting member for exciting an incident vibration wave to be propagated in said aperture electrode and a reflecting member for reflecting the incident vibration wave propagated along said aperture electrode to form a reflective vibration wave to be propagated along said aperture electrode back to the exciting member; and modulating means for modulating vibration properties of the vibration caused by said oscillating means, wherein said modulating means prevents the incident wave and the reflective vibration wave from producing a standing wave having a node on a fixed position on said aperture electrode, said modulating means comprising frequency modulating means for modulating frequency of the vibration caused by said oscillating means and standing wave preventing means for preventing the incident and reflective vibration waves from producing the standing wave when the incident and reflective vibration wave overlap, said standing wave preventing means comprising interference preventing means for preventing the overlapping incident and reflective vibration waves from interfering with each other.

24. The image forming apparatus of claim 23, wherein said interference preventing means includes frequency changing means for allowing the frequencies of the overlapping incident and reflective vibration waves to differ.

25. The image forming apparatus of claim 24, wherein said frequency changing means varies the frequency of the incident vibration wave in a sweeping manner.

* * * * *